United States Patent
Gleeson et al.

(10) Patent No.: US 7,315,345 B2
(45) Date of Patent: Jan. 1, 2008

(54) ELECTRO-CONVECTIVE DIFFRACTIVE DEVICE

(75) Inventors: James T Gleeson, Kent, OH (US); Joshua S Martin, Waltham, MA (US)

(73) Assignee: Kent State University, Kent, OH (US)

(*) Notice: Subject to any disclaimer, the term of this patent is extended or adjusted under 35 U.S.C. 154(b) by 0 days.

(21) Appl. No.: 10/609,115

(22) Filed: Jun. 27, 2003

(65) Prior Publication Data
US 2004/0263772 A1 Dec. 30, 2004

(51) Int. Cl.
*G02F 1/13* (2006.01)
*G02F 1/1333* (2006.01)

(52) U.S. Cl. .................. 349/201; 349/88; 349/193
(58) Field of Classification Search .................. 349/86, 349/88, 193, 201–202
See application file for complete search history.

(56) References Cited

U.S. PATENT DOCUMENTS

| | | | |
|---|---|---|---|
| 4,590,146 A * | 5/1986 | Wallbillich | 430/281.1 |
| 5,434,685 A * | 7/1995 | Pirs et al. | 349/88 |
| 5,995,173 A * | 11/1999 | Barberi et al. | 349/33 |
| 6,122,024 A * | 9/2000 | Molsen et al. | 349/88 |
| 6,864,931 B1 * | 3/2005 | Kumar et al. | 349/88 |

* cited by examiner

*Primary Examiner*—Dung T. Nguyen
(74) *Attorney, Agent, or Firm*—Fay Sharpe LLP

(57) ABSTRACT

A method for producing a diffraction grating is provided. First, a mixture including nematic liquid crystal, dopant, and polymerizable precursor is introduced between two electrically conductive substrates having alignment layers for inducing orientation of the liquid crystal director. A potential difference is applied across the liquid crystal to cause a spontaneous self-assembly of the liquid crystal into an array of convective rolls. Thereafter, the roll structure is stabilized by the creation of a polymeric network through polymerization and/or cross-linking of the polymerizable precursor. The convective roll structure serves as a template for the formation of the polymeric network.

7 Claims, 3 Drawing Sheets
(2 of 3 Drawing Sheet(s) Filed in Color)

ELECTRO-CONVECTIVE DIFFRACTIVE DEVICE

BACKGROUND OF THE INVENTION

The present invention generally relates to diffraction gratings, particularly electro-convective diffractive devices. The present invention also relates to a method for fabricating such diffraction gratings through spontaneous self-assembly of liquid crystals into arrays of convective rolls.

Adaptive electro-optic devices are of paramount importance for information collection from the environment. In military applications, this involves both detection and evasion of weapons platforms. Because detection technologies now exploit ever-larger regions of the electromagnetic spectrum, evasion technologies must keep pace, and wavelength-agile devices that operate in the sub-millimeter infrared band are of burgeoning importance. Furthermore, there are many civilian applications for advanced diffraction gratings. Such applications include multi-spectral imaging for environmental remote-sensing, wavelength division multiplexing for communications, and spectroscopy.

Diffraction gratings are integral parts of an enormous variety of devices that employ electromagnetic radiation. A diffraction grating is realized when a material possesses a spatially periodic modulation of either the real or imaginary parts of the refractive index. When an electromagnetic wave encounters this material, the spatial modulation couples with the wavelength of the electromagnetic wave to deflect the wave in a manner depending upon its wavelength. Thus, the spatial modulation and, more specifically, the periodicity of the modulation, as well as the wavelength of the electromagnetic wave, determine the path of the electromagnetic wave through this material. This property makes gratings useful for separating multi-wavelength electromagnetic waves into their constituent wavelengths. Additionally, these diffractions gratings are useful for steering light beams by deflecting them.

The most common method for making diffraction gratings is the replica technique, in which a regular pattern of lines is scribed on a molding surface. This molding surface is then applied to a blank, usually of plastic, and the pattern is replicated on the plastic surface. Gratings like this are inexpensive and durable, but cannot be changed in any fashion after they are made. Other technologies employing chiral liquid crystals have also been used. A notable example is U.S. Pat. No. 6,188,462, wherein the spatial periodicity needed to form a grating derives from the intrinsic molecular properties of cholesteric liquid crystals. The spatial periodicity can be adjusted somewhat by applying an electric field, but the capability for more substantial adjustment in diffraction gratings is still desired in the art.

The present invention provides a dynamic method for spontaneous self-assembly of diffraction gratings. The grating spacing (also called the grating constant) and structure factor of the diffraction gratings can be tuned by the amplitude and frequency of an applied electric field.

SUMMARY OF THE INVENTION

When subjected to an externally applied electric field, nematic liquid crystal maintained between substrates can spontaneously self-assembly into a regular array of convective rolls—a phenomenon known as electro-hydrodynamic convection. This is generally depicted in FIG. 1, wherein a electric field is applied across substrates with transparent electrodes 1 and 2, which are spaced from each other by a distance d. Convective rolls of liquid crystal 3 are formed between transparent electrodes. 1 and 2. In a "convective roll" (such as convective roll 3), the liquid crystal flows in a rotating fashion, as represented by the arrows defining rolls 3. Neighboring rolls 3 rotate in opposite directions, and the liquid crystal directors (represented by the multiple dash lines in FIG. 1) tilt in the direction of rotation. The structure of the convective roll array depends upon the amplitude and frequency of the electric field. Inside the cells, the nematic liquid crystal undergoes circular flow and forms a highly regular pattern, accompanied by a distortion of the optical axis. Herein, this dynamic process is the basis for forming electro-convective diffractive devices, because it produces a periodic modulation of the liquid crystal optical properties.

In this invention, diffraction gratings are formed with nematic liquid crystal samples confined between substrates, and these diffraction gratings operate at wavelengths determined by the repeat spacing of the convective rolls into which the liquid crystals assemble. The spacing can range up to about 1 mm, yielding infrared performance at wavelengths up to about 250 μm. The grating spacing and structure factor can be tuned during manufacture of the diffraction grating by controlling the amplitude and frequency of the applied electric field. The spatial periodicity of the diffraction grating arises from the intrinsic properties of the nematic liquid crystal materials.

More particularly, this invention relates to a diffraction device in which the diffractive element, i.e., the grating, is an array of periodic convective rolls that forms when a polymerizable mixture, which contains nematic liquid crystal and is disposed between substrates, is subjected to an electric field of appropriate frequency and amplitude. The polymerizable mixture includes nematic liquid crystal, dopant, polymerizable precursor, and a polymerization initiator. In a particularly preferred embodiment, the polymerizable precursor is photopolymerizable, and the initiator is a photoinitiator.

In general, the present invention provides a tunable diffraction grating comprising a cell with a first cell wall spaced from a second cell wall, with electrodes disposed on facing surfaces of the first and second cell walls. An array of nematic liquid crystal convective rolls are arranged periodically in space between said first cell wall and said second cell wall, and a polymeric network stabilizes said array of nematic liquid crystal convective rolls.

The present invention also provides a method for producing a diffraction grating comprising the steps of providing a polymerizable mixture of nematic liquid crystal, dopant, and polymerizable precursor, introducing the polymerizable mixture between two electrically conductive substrates; applying a potential difference across the liquid crystal to cause the nematic liquid crystal to assemble into an array of convective rolls; and stabilizing the convective roll structure by forming a polymer network from the polymerizable precursor, wherein the polymer network is templated by the convective roll structure.

DESCRIPTION OF THE DRAWINGS

For a complete understanding of the objects, techniques and structure of the invention, reference should be made to the following detailed description and accompanying drawings, and color photographs. The file of this patent contains at least one photograph executed in color. Copies of this patent with the color photographs will be provided by the Patent and Trademark Office upon request and payment of the necessary fee.

PREFERRED EMBODIMENT FOR CARRYING OUT THE INVENTION

Figure 2:
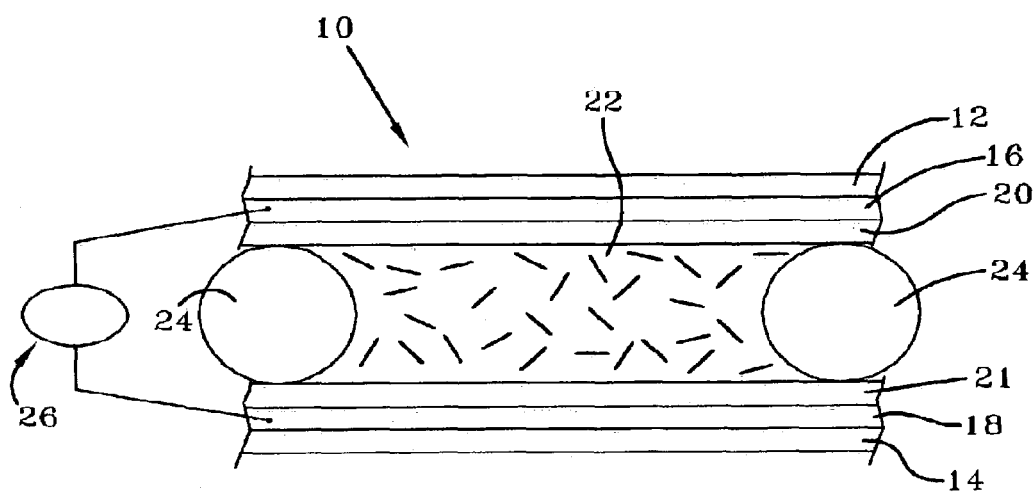
FIG. 2 is a representative cross-sectional view of a precursor to a diffraction grating according to this invention.

With reference to FIG. 2, a precursor to a diffraction grating according to this invention is designated generally by the numeral 10. Precursor 10 includes a first cell wall 12 spaced from a second cell wall 14. Cell walls 12, 14 can be any transparent material, for example, glass plates. Also, one of cell walls 12, 14 can be non-transparent. When one of cell walls 12, 14 is non-transparent, the precursor 10 can be used in a reflection mode.

An electrode 16 is disposed on an inner surface of cell wall 12 and an electrode 18 is disposed on an inner surface of cell wall 14, such that electrodes 16, 18 are disposed on facing surfaces of the first and second cell walls 12, 14. The electrodes are any electrical conducting electrodes. An example of a suitable electrode is an indium tin oxide (ITO) electrode. The electrodes are coated with a material such as a polymer, as is common in the art. Suitable polymers would include polyimides, polyvinyl alcohols, and any other polymer that does not interfere with the present invention. Polymer mixtures may also be employed. The material on the electrode is aligned unidirectionally to provide respective unidirectionally aligned alignment layers 20, 21 disposed on each electrode 16, 18. Unidirectional alignment may be provided through rubbing or photoalignment with polarized light or other methods known or here after discovered. Alignment layer 20 or 21 or both induces a liquid crystal director, in the vicinity of wall 12 or 14, to lie parallel to the wall 12, 14, in a common direction. By way of example, and without limitation, alignment layer 20 may be an applied rubbed polyimide alignment layer or an obliquely evaporated oxide or a rubbed poly vinyl alcohol layer. Alternatively, an in situ polyimide layer photopolymerized using polarized ultraviolet light may be used as the alignment layer.

A polymerizable mixture 22 is disposed between first and second cell walls 12,14. For reasons that will become more apparent hereinbelow, polymerizable mixture 22 includes a nematic liquid crystal, dopant, and polymerizable precursor. This polymerizable mixture 22 is formed into an array of nematic liquid crystal convective rolls 3 through application of an electric field across electrodes 16, 18, and the roll structure 3 is stabilized through subsequent polymerization and/or cross-linking of the polymerizable precursor. As used herein, "polymerization and/or cross-linking" is to be understood as "polymerization or cross-linking or both polymerization and cross-linking."

A wide variety of liquid crystalline materials are potentially suitable for polymerizable mixture 22. The liquid crystal material must possess a nematic phase, and either positive conductivity anisotropy and sufficiently small dielectric anisotropy or negative conductivity anisotropy and sufficiently large dielectric anisotropy. For example, phenyl benzoates like p-methoxyphenyl-p'-hexyloxybenzoate, p-octyloxyphenyl-p'-pentyloxybenzoate or mixtures thereof. Other candidates include Schiffs bases like methoxy benzylidene butylanaline, or alkoxy alkyl azoxybenzenes like 4-methoxy-4-butyl azoxybenzene or mixtures thereof. These materials are commercially available and may be readily synthesized from commercially available precursors.

At least one dopant is present in the polymerizable mixture 22 in order to induce the required electrical conductivity. That is, dopant is present so that an electric field applied across electrodes 16, 18 will cause the nematic liquid crystal material to self-assemble into a regular array of convective rolls 3 through the phenomenon known as electro-hydrodynamic convection. This self-assembly causes a phase separation between the nematic liquid crystal and the polymerizable precursors, and subsequent polymerization and/or cross-linking of the polymerizable precursors will form a polymeric network that is templated or bounded by the array of convective rolls. The polymeric network stabilizes the convective roll structure. Useful dopants may be selected from octyloxyphenol, pentyloxybenzoic acid, tetrabutyl ammonium bromide, and mixtures thereof. Charge transfer salts such as tetracyanoquinone and related compounds may also serve as useful dopants.

The polymerizable precursors present in polymerizable mixture 22 may generally be selected from polymeric precursors capable of forming a polymer network in a controlled manner (i.e., when selectively activated to form such a network). The precursor chosen must also be soluble in the liquid crystal so that the desired phase separation and templating may occur upon the formation of the convective roll structure through electro-hydrodynamic convection. Particularly preferred polymerizable precursors include, without limitation, bisphenol A dimethacrylate, other acrylates or methacrylates, vinyl ethers, styrenes or epoxies or mixtures thereof. The polymerizable precursor will be added at a concentration of from about 1% to about 6% by weight of the polymerizable mixture 22.

As mentioned, the polymerizable precursors are present for the creation of a stabilizing polymeric network templated by the self-assembled array of nematic liquid crystal convective rolls. The polymerizable precursors are thus chosen so that they may be polymerized and/or cross-linked in a controlled manner. Particularly, the polymerizable precursors should not polymerize and/or cross-link (i.e., form a polymeric network) until initiated to do so, after formation of the convective rolls. Multiple methods exist for controlling polymerization and/or cross-linking of polymeric precursors, and virtually any method may be employed that ensures that the polymeric precursors will not begin to form a polymer network until the convective roll template is formed. Most commonly, in order to control the formation of the polymeric network, an initiator is part of polymerization mixture 22. The initiator may be triggered by light (photoinitiator) or by heat (thermal initiation) or other means. As non-limiting examples of photoinitiators, they may be selected from benzoketones such as benzoin methyl ether. The photoinitiator is typically added at a concentration of from about 0.1 to about 1% by weight of the polymerizable mixture 22. Polymerization and cross-linking reactions and other methods for controlled formation of polymeric networks that would stabilize the convective roll structure are known in the art, and this invention is not limited to or by any particular method.

The polymerizable mixture 22 thus described is introduced via capillary action between first and second cell walls 12, 14, which are kept separated from each other by appropriate spacers 24. The separation of the plates will generally range from about 5 microns to about 250 microns.

Figure 1:
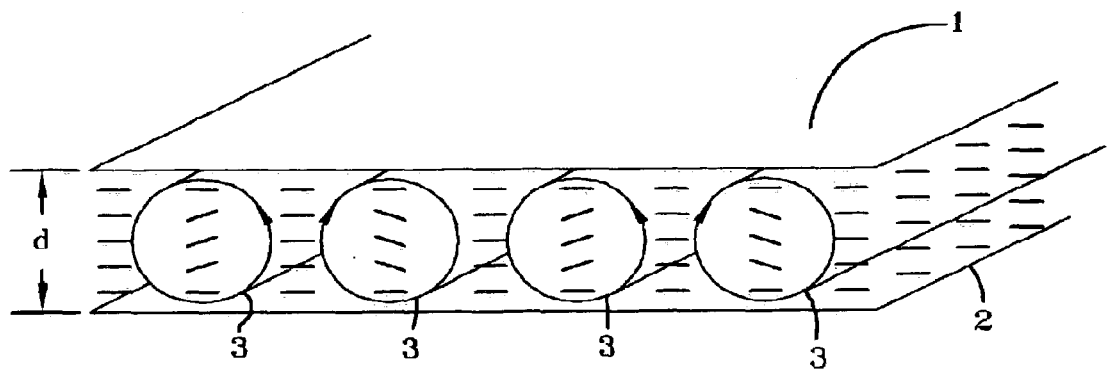
FIG. 1 is a schematic representation of electro-hydrodynamic convection in nematic liquid crystal cells.

After the cell is filled, wires are attached to electrodes 16, 18, and an electric potential difference of a chosen frequency and amplitude is applied across the polymerizable mixture 22, as generally represented at the numeral 26. Upon the application of the electric field, the liquid crystal spontaneously self-assembles into an array of convective rolls (see FIG. 1). These rolls are arranged periodically in space, with a grating constant approximately twice the separation distance "d" between the cell walls 12, 14 (e.g., glass plates), with variations around this grating constant resulting from the frequency of the applied electric field. Thus, the grating constant is believed to be significantly dependent upon the distance between walls 12, 14 and the frequency of the applied electric field. The periodic roll structure is subsequently stabilized by inducing the creation of a polymeric network from the polymerizable precursors.

The application of the electric field (as at 26), and the subsequent cross-linking of the polymerizable precursor, provides a diffraction grating from precursor 10. Polymerizable mixture 22 phase separates, with nematic liquid crystal formed into a periodic roll structure that serves as a template for the creation of a polymeric network.

Polymerization and/or cross-linking is carried out, either through photoinitiation or thermal initiation or otherwise, while the electric potential difference is applied to induce the convective roll structure. If common photoinitiators are present in polymerization mixture 22, ultraviolet light is directed onto the cell, and the photoinitiator causes polymerization and cross-linking of the polymerizable precursor. The duration of the illumination with ultraviolet light is typically short, in the range of from about 2 to about 5 seconds. The optimal duration of exposure is believe to depend on the intensity of the light as well as the concentration and particular formulation of precursor and photoinitiator. If thermal initiators are used, the cell may be brought to the necessary temperature for polymerization.

This procedure produces a stable diffraction grating that persists when the electric field is removed, and the resultant diffraction grating, more particularly, electro-convective diffractive device, has many advantages over diffraction gratings of the prior art. The present diffraction gratings are significantly quicker and easier to manufacture, and may even be manufactured in vast quantities by employing continuous roll-type processing methods. Furthermore, the diffraction grating can be manufactured using flexible substrates, such as Mylar™ (DuPont, Delaware, USA), which enable the grating to be conformed to surfaces that are not flat. The ability to use flexible substrates also provides diffraction gratings that are far more rugged than glass or replica gratings, which must be made out of rigid, brittle materials.

The diffraction gratings of this invention are easily tunable, and the grating constant may be varied over a wide spectrum by varying the frequency and amplitude of the potential difference that is applied before the formation of the polymeric network. When the distance between the electrodes is fixed, the grating constant decreases as the frequency increases. Changes in amplitude also have some small effect on the grating constant, although the distance between the walls (such as walls 12, 14) and the frequency of the applied field are believed to be more determinative of the grating constant.

The structure factor, on the other hand, can be tuned after polymerization and/or cross-linking, during the operation of the diffraction grating. Although the convective roll structure, and, thus, the grating constant, is frozen in after the formation of the polymeric network, the structure of the liquid crystal within the rolls or the orientation of the liquid crystal directors within the roll can be altered by application of an electric field. Thus, after the convective roll structure is stabilized by the templated formation of the polymeric network, the structure factor can be adjusted, but not the grating constant.

EXPERIMENTAL

A diffraction grating was produced according to the method provided above. The liquid crystalline material was a mixture of phenyl benzoates, commonly known as Mischung V. Mischung V is composed of four compounds as follows:

| Mischung V Components | Weight % |
|---|---|
| p-methoxyphenyl-p'-hexyloxybenzoate | 22.0% |
| p-octyloxyphenyl-p'-pentyloxybenzoate | 30.3% |
| p-heptyloxypenyl-p'-hexyloxybenzoate | 13.3% |
| p-hexylphenyl-p'-butyloxybenzoate | 34.4% |

1.74 weight % of equal parts octyloxyphenol and pentyloxybenzoic acid was added as the dopant. 4.9 weight % of bisphenol A dimethacrylate was added as the polymerizable precursor, and 0.87 weight % of benzoin methyl ether as the photoinitiator.

The resultant mixture was introduced via capillary action into a liquid crystal sample cell that consisted of two thin, flat glass plates, placed parallel to one another and kept separated at a distance of approximately 18 microns. More particularly, the sample cells were purchased from E.H.C. Co. of Tokyo, Japan. The separation of the plates is maintained, according to the manufacturer, by adding glass spheres of particular size to the adhesive used to fix the plates together. Each plate has applied to it a layer of indium tin oxide to render the surface of the glass electrically conductive. Each glass plate was also rubbed with a polyimide alignment layer to induce the liquid crystal director to lie parallel to the plate.

Wires were attached to the conducting areas of each plate, an electric potential difference was applied across the liquid crystal layer. The frequency was 13.7 Hz and the amplitude was $26.6 V_{rms}$. The applied potential difference caused the spontaneous self-assembly of the liquid crystal into an array of convective rolls. This array was then stabilized by inducing cross-liking between the polymerizable precursor molecules by exposing the liquid crystal sample to ultraviolet light.

The liquid crystal sample was placed on a microscope stage. The microscope was equipped with an epi-illumination system and high pressure mercury lamp. More particularly, the lamp employed was an HBO 103 W/2 short arch lamp manufactured by Osram of Berlin, Germany. During application of the electric potential difference, the sample cell was illuminated with ultraviolet light for two to three seconds. The luminous flux of the ultraviolet light was estimated at $0.6 \text{ cd/cm}^2$.

Figure 3:
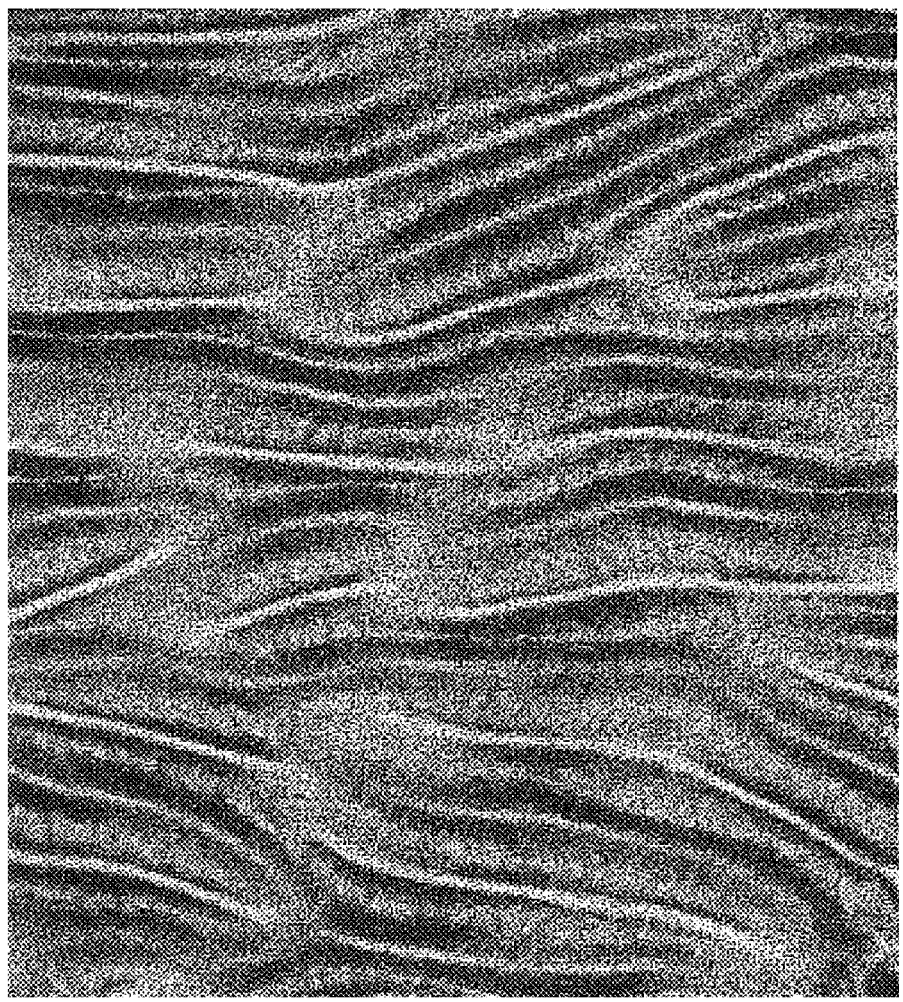
FIG. 3 is a color photomicrograph of a polymer stabilized electro-convective diffractive device.
Figure 4:
FIG. 4 is a color photograph of a far field diffraction pattern of helium-neon laser beam transmitted through a polymer stabilized electro-convective diffractive device.

This experiment was successful in producing a stable diffraction grating that persisted when the electric field was removed. A micrograph of this grating is shown in FIG. 3, and a photo of the diffraction pattern obtained by passing a helium neon laser through the grating at normal incidence is shown in FIG. 4.

Thus, it should be evident that the method of the present invention is effective at producing diffraction gratings by spontaneous self-assembly through electro-hydrodynamic convection. Although an exemplary embodiment of this method has been provided herein, the present invention should not be limited thereto or thereby. The claims will serve to define the invention.

What is claimed is:

1. A tunable diffraction grating comprising:
   a cell with a first cell wall spaced from a second cell wall;
   electrodes disposed on facing surfaces of the first and second cell walls; and
   an array of nematic liquid crystal convective rolls, wherein said convective rolls are arranged periodically in a space between said first cell wall and said second cell wall; and
   a polymeric network stabilizing said array of nematic liquid crystal convective rolls, wherein a grating constant of said tunable diffraction grating is determined by a structure of said convective rolls.

2. The tunable diffraction grating of claim 1, wherein the convective rolls are arranged with the grating spacing approximately twice the separation distance between said first and second cell walls.

3. The tunable diffraction grating of claim 1, further comprising:
   a power source connected to said electrodes to apply an electric field, wherein said convective rolls are arranged with a structure factor, and said structure factor is adjusted by application of an electric field though said power source.

4. A method for producing a diffraction grating comprising the steps of:
   introducing a polymerizable mixture including nematic liquid crystal, dopant, and polymerizable precursor between two electrically conductive substrates;
   applying a potential difference across the polymerizable mixture to cause the nematic liquid crystal to assemble into an array of convective rolls; and
   stabilizing the convective roll structure by forming a polymer network from the polymerizable precursor, wherein the polymer network is bounded by the convective roll structure and a grating constant of said diffraction grating is determined by the structure of said convective rolls.

5. The method according to claim 4, wherein the polymerizable mixture further includes an initiator, said initiator being activated in said step of stabilizing to initiate the formation of the polymer network from the polymerizable precursor.

6. The method according to claim 5, wherein the initiator is a photoinitiator and said step of stabilizing includes photoinitiation of the photoinitiator.

7. The method according to claim 4, wherein said convective rolls are arranged with a structure factor after said step of stabilizing, and the method further comprises, after said step of stabilizing:
   adjusting the structure factor by application of an electric field though at least one of the electrically conductive substrates.

* * * * *